3,468,971

REACTIONS OF ALKALI METAL TETRAALKYL-ALUMINUM COMPOUNDS WITH ACTIVE HALOGEN COMPOUNDS

David L. Skinner, Arlington Heights, Ill., assignor to The Procter & Gamble Company, Cincinnati, Ohio, a corporation of Ohio No Drawing. Filed Dec. 20, 1966, Ser. No. 603,099
Int. Cl. C07c 21/00, 17/32
U.S. Cl. 260—677 2 Claims

ABSTRACT OF THE DISCLOSURE

A process for alkylating active halogen compounds, such as allyl halides, benzyl halides, and halogens, by reacting the active halogens with alkali metal tetraalkylaluminum compounds at a temperature of from 0° C. to 200° C. The following equations are representative alkylation reactions:

(1) $MAlR_4 + CH_2{=}CHCH_2X \rightarrow CH_2{=}CHCH_2R + AlR_3 + MX$ (2) $MAlR_4 + C_6H_5CH_2X \rightarrow C_6H_5CH_2R + AlR_3 + MX$ (3) $MAlR_4 + X_2 \rightarrow RX + AlR_3 + MX$ (M=alkali metal, R=alkyl, X=halogen)

This invention relates to a novel process for reacting alkali metal tetraalkylaluminum compounds with active halogen compounds.

It is an object of this invention to provide a novel process for reacting alkali metal tetraalkylaluminum compounds with active halogen compounds thereby alkylating the active halogen compounds.

These and other objects can be accomplished by the process described herein which involves the surprising discovery that alkali metal tetraalkylaluminum compounds react with active halogen compounds. The alkali metal tetraalkylaluminum compounds useful in the process of this invention are of the formula $$MAlR_4$$

wherein M is an alkali metal selected from the group consisting of lithium, potassium, and sodium, and R is an alkyl group containing from 1 to about 20 carbon atoms. Each of the four alkyl groups in these alkali metal tetraalkylaluminum compounds can be the same or different. Each alkyl group can have varying numbers of carbon atoms, and each can be either straight of branched chained.

The reactive alkali metal tetraalkylaluminum compounds which are useful in the process of this invention are known. It is taught in the prior art that these compounds can be economically and conveniently obtained by reacting an alkali metal with an aluminum trialkyl. This process for obtaining alkali metal tetraalkylaluminum compounds can be represented by the reaction equation:

$$3M + 4AlR_3 \rightarrow 3MAlR_4 + Al$$

wherein M is an alkali metal selected from the group consisting of lithium, sodium, and potassium, and R is an alkyl group containing from 1 to about 20 carbon atoms. Each of the alkyl groups in the aluminum trialkyl compound can be the same or different. If the alkyl groups in the aluminum trialkyl compound are not identical, the alkyl groups in the resultant alkali metal tetraalkylaluminum compound will be correspondingly unidentical. The preparation of the alkali metal tetraalkylaluminum compound is generally carried out by reacting the alkali metal and aluminum trialkyl in an inert solvent, for example, benzene or toluene, at a wide range of temperatures, for example, between 0° C. and 200° C. The alkali metal tetraalkylaluminum compounds are very sensitive to oxygen, carbon dioxide, and water; therefore, the preparation of these compounds is conducted under the atmosphere of an inert gas, for example, argon. The above reaction produces free aluminum in addition to the desired alkali metal tetraalkylaluminum compound. Procedures for obtaining alkali metal tetraalkylaluminum compounds are discussed in: A. V. Grosse and J. M. Mavity, ACS Abstracts of Papers, 96th Meeting, Milwaukee, Wis., September 1938, page M. 11. The free aluminum produced is preferably removed and can be utilized for the further production of the aluminum trialkyl reactant by reaction with olefin and hydrogen according to processes well known in the prior art. An elaborate collection of the prior art relating to the production of aluminum trialkyl compounds can be found in Zeiss, Organometallic Chemistry, chapter 5 (Reinhold Publishing Corp., 1960). Other methods of obtaining the reactive alkali metal tetraalkylaluminum compounds useful in the process of this invention are known and can be useful.

In reactions of alkali metal tetraalkylaluminum compounds and active halogen compounds embodied in the process of this invention a variety of products are obtained depending on the character of the active halogen compound which is alkylated.

Among the active halogen compounds that are useful in the process of this invention and which can be alkylated thereby are (1) allyl halides, especially allyl chlorides, allyl bromide, and allyl iodides; (2) benzyl halides, especially benzyl chloride, benzyl bromide, and benzyl iodide; and (3) molecular halogens, especially chlorine, bromine and iodine.

The novel alkylating reaction between the alkali metal tetraalkylaluminum compounds useful in the process of this invention and allyl halides can be represented by the following reaction equation:

$$MAlR_4 + CH_2{=}CHCH_2X \rightarrow CH_2{=}CHCH_2R + AlR_3 \rightarrow MX$$

(Equation A)

wherein M is an alkali metal selected from the group consisting of lithium, potassium, and sodium, R is an alkyl group containing from 1 to about 20 carbon atoms, and X is a halogen selected from the group consisting of chlorine, bromine, and iodine. By virtue of this reaction, the allyl halide is alkylated. As seen from Equation A, above, the products of the reaction are α-olefins containing from 4 to about 23 carbon atoms, aluminum trialkyls, and an alkali metal halide salt. Examples of α-olefins which can be obtained by this process are 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, and 1-tricosene. Examples of alkali metal halide salts which can be obtained by this process are lithium, sodium, and potassium chlorides, bromides, and iodides. The α-olefins and alkali metal halide salts produced are well known items of commerce and are known to have many valuable uses. The aluminum trialkyls obtained can be reacted with an alkali metal, as for example, lithium, sodium, and potassium, in the manner hereinbefore disclosed to obtain more of the alkali metal tetraalkylaluminum reactants used as a reactant in the process of this invention.

The reaction of the above-mentioned alkali metal tetraalkylaluminum compounds with benzyl halides can be represented by the reaction equation:

$$MAlR_4 + C_6H_5CH_2X \rightarrow C_6H_5CH_2R + AlR_3 + MX$$

(Equation B)

wherein M is an alkali metal selected from the group consisting of lithium, sodium, and potassium, R is an alkyl group containing from 1 to about 20 carbon atoms, and X is a halogen selected from the group consisting of chlorine, bromine, and iodine. By virtue of this reaction the benzyl halide is alkylated. As seen from Equation B, above, the products of the reaction are alkyl benzenes with alkyl groups containing from 2 to about 21 carbon atoms, aluminum trialkyls, and an alkali metal halide salt. Examples of alkyl benzenes which can be obtained by this process are ethylbenzene, propylbenzene, pentylbenzene, hexylbenzene, octylbenzene, nonylbenzene, decylbenzene, undecylbenzene, dodecylbenzene, tridecylbenzene, tetradecylbenzene, pentadecylbenzene, hexadecylbenzene, heptadecylbenzene, octadecylbenzene, nonadecylbenzene, eicosylbenzene, and heneicosylbenzene. Examples of alkali metal halide salts which can be obtained by this process are lithium, sodium, and potassium chlorides, bromides, and iodides just as in Equation A. The alkyl benzenes and alkali metal halide salts produced are well known items of commerce and are known to have many valuable uses. The aluminum trialkyls obtained in this reaction can be used in the manner hereinbefore disclosed to generate more of the alkali metal tetraalkylaluminum compounds useful in the process of this invention.

The novel reaction of the above-mentioned alkali metal tetraalkylaluminum compounds with molecular halogens can be represented by the reaction equation:

$$MAlR_4+X_2\rightarrow RX+AlR_3+MX$$

(Equation C)

wherein M is an alkali metal selected from the group consisting of lithium, sodium, and potassium, R is an alkyl group containing from 1 to about 20 carbon atoms, and X is a halogen selected from the group consisting of chlorine, bromine, and iodine. By virtue of this reaction, the molecular halogen is alkylated. As seen from Equation C, the products of the reaction are alkyl halides, for example, alkyl chlorides, alkyl bromides, and alkyl iodides, containing from 1 to about 20 carbon atoms in the alkyl group, aluminum trialkyls, and alkali metal halide salt. Examples of alkyl halides which can be obtained by this process are methyl chloride, ethyl chloride, pentyl chloride, hexyl chloride, undecyl chloride, pentadecyl chloride, hexadecyl chloride, pentyl bromide, hexyl bromide, heptyl bromide, dodecyl bromide, tetradecyl bromide, hexadecyl bromide, pentyl iodide, hexyl iodide, heptyl iodide, octyl iodide, nonyl iodide, decyl iodide, tetradecyl iodide, pentadecyl iodide, eicosyl iodide. Examples of alkali metal halide salts which can be obtained by this process are lithium, sodium, and potassium chlorides, bromides, and iodides. The alkyl halides and alkali metal halide salts produced are well known items of commerce and are known to have many valuable uses. The aluminum trialkyls obtained in the reaction can be used in the manner hereinbefore disclosed to generate more of the alkali metal tetraalkylaluminum compounds useful in the process of this invention. The process for reacting the above-mentioned active halogen compounds and alkali metal tetraalkylaluminum compounds consists essentially of contacting the active halogen compound and the alkali metal tetraalkylaluminum compound at a temperature of from about 0° C. to 200° C., preferably from about 20° C. to about 100° C. The alkali metal tetraalkylaluminum compounds react with oxygen, carbon dioxide, and water, and for this reason, the process of this invention is preferably conducted under the atmosphere of an inert gas. Argon, helium, neon, are suitable inert gases, argon being preferred. Other gases, for example nitrogen, which are inert to the reactants and the products, can also be used.

While it is not critical, the reaction process of this invention is preferably conducted in a suitable amount of an inert liquid medium such as a hydrocarbon solvent, e.g., hexane, octane and benzene. Diethyl ether is also an especially suitable liquid medium in which to conduct the reaction. The amount of such liquid is not critical, but especially suitable amounts are from about one-half liter to about five liters per mole of alkali metal tetraalkylaluminum compound being reacted. The particular reaction medium in which the reaction is conducted is not critical to the process disclosed herein, but the above-mentioned liquids are preferred for use as reaction media because of ease of handling. Other inert liquids, for example, mineral oil, can be useful.

The reaction is preferably conducted by adding the active halogen compound slowly to the alkali metal tetraalkylaluminum compound. While not necessary, it is often desirable to dilute the active halogen compound in a suitable inert liquid, as for example, a quantity of the same liquid used to disperse the alkali metal tetraalkylaluminum compound in a particular reaction. While not essential to the reaction process disclosed hereinbefore, it is preferred to stir the reaction mixture during the reaction to insure good mixing of the reactants.

While the ratios of the reactants used are not critical, it is preferred to react from about one to about three parts (on a molar basis) of the active halogen compound and one part (on a molar basis) of the alkali metal tetraalkylaluminum compound; it being most preferred to react equimolar amounts of the two reactants.

When the active halogen being reacted is a molecular halogen, for example, chlorine, bromine, and iodine, actinic radiation should be excluded, e.g. by employment of a black reaction vessel, to prevent free radical halogen reactions.

The reaction products can be separated easily by distillation.

The alkylation reaction processes of this invention smoothly, and the products of the reaction are produced in high yields. Yields of from 40% to 70% of $\alpha$-olefins, for example, 1-heptene and 1-nonene, alkyl benzenes, for example, propyl benzene and amyl benzene, and alkyl halides, for example, butyl chloride and butyl bromide, can be obtained.

The following specific examples are given to illustrate the invention with more particularity, and are not to be construed as limiting.

EXAMPLE 1

The active halogen compound allyl bromide can be reacted with sodium tetrabutylaluminum using the following procedure:

A dry 250 ml. three-necked flask is fitted with a stirrer, a condenser, a dropping funnel, and means for adding argon gas. The flask is swept with argon gas, and an argon atmosphere is maintained until the completion of the reaction. Into this flask is weighed 13.9 grams (0.05 moles) of sodium tetrabutylaluminum. There is then added to the flask 100 ml. of dry hexane. 6.05 grams (0.05 moles) of allyl bromide, dissolved in 25 ml. of hexane, is then added dropwise to the mixture by means of the dropping funnel. The reaction takes place at room temperature (25° C.) and sodium bromide, which is formed immediately, begins precipitating from the reaction mixture as the reaction progresses. After the addition of the allyl bromide is completed, the reaction mixture is refluxed at about 70° C. for 1½ hours to insure completeness of the reaction. The reaction mixture is stirred until the reaction is completed. About 1.5 grams of 1-heptene can be recovered from the reaction mixture.

EXAMPLE 2

When, in Example 1, 13.1 grams (0.05 moles) of lithium tetrabutylaluminum or 14.7 grams (0.05 moles) of potassium tetrabutylaluminum is substituted for sodium tetrabutylaluminum, and 3.5 grams (0.05 moles) of allyl chloride is substituted for allyl bromide, substantially the same results are obtained in that 1-heptene can be obtained.

EXAMPLE 3

Employing the procedure used in Example 1, 3.8 grams (0.05 moles) of the active halogen compound, allyl chloride, can be reacted with 18.7 grams (0.05 moles) of lithium tetrahexylaluminum to obtain 1-nonene.

EXAMPLE 4

The active halogen compound, benzyl bromide, can be reacted with sodium tetraethylaluminum using the following procedure:

A dry 250 ml. three-necked flask is fitted with a stirrer, a condenser, a dropping funnel, and means for adding argon gas. The flask is swept with argon gas, and an argon atmosphere is maintained until the completion of the reaction. Into this flask is weighed 8.3 grams (0.05 moles) of sodium tetraethylaluminum. There is then added to the flask 200 ml. of dry ethyl ether. 8.5 grams (0.05 moles) of benzyl bromide in 25 ml. of dry ethyl ether is then added dropwise to the mixture by means of the dropping funnel. The reaction takes place at room temperature (25° C.), and sodium bromide, which is formed immediately, begins precipitating from the mixture as the reaction progresses. To insure completeness of reaction the mixture is refluxed at from about 35° C. to about 40° C. for about one hour after the addition of the benzyl bromide is completed. The reaction mixture is stirred until the reaction is completed. About 5.0 grams of propylbenzene can be recovered from the reaction mixture.

EXAMPLE 5

When, in Example 4, 13.9 grams (0.05 moles) of sodium tetrabutylaluminum is substituted for sodium tetraethylaluminum, substantially the same results are obtained in that a similar alkylation reaction occurs, and about 5.0 grams of amylbenzene can be recovered from the reaction mixture.

EXAMPLE 6

When, in Example 5, 13.1 grams (0.05 moles) of lithium tetrabutylaluminum, is substituted for sodium tetrabutylaluminum, substantially the same results are obtained in that amylbenzene can be obtained.

EXAMPLE 7

Employing the procedure used in Example 4, 6.35 grams (0.05 moles) of the active halogen compound benzyl chloride can be reacted with 19.5 grams (0.05 moles) of sodium tetrahexylaluminum to obtain heptylbenzene.

EXAMPLE 8

The active halogen compound, bromine, can be reacted with sodium tetrabutylaluminum using the following procedure:

A dry 250 ml. three-necked flask is fitted with a stirrer, a condenser, a dropping funnel, and means for adding argon gas. The flask is swept with argon gas, and an argon atmosphere is maintained until completion of the reaction. Into this flask is weighed 13.9 grams (0.05 moles) sodium tetrabutylaluminum. There is then added 150 ml. of dry hexane. A solution of 5.3 grams (0.05 moles) of bromine in 25 ml. of hexane is then added to the mixture dropwise over a one hour period with stirring. The reaction takes place at room temperature (25° C.), and sodium bromide begins precipitating as the reaction progresses. About 2.5 grams of butyl bromide can be recovered from the reaction mixture.

EXAMPLE 9

Where, in Example 8, 0.05 mole of lithium tetrabutylaluminum or potassium tetrabutylaluminum is substituted for sodium tetrabutylaluminum, substantially the same results are obtained in that butyl bromide can be obtained.

EXAMPLE 10

The active halogen compound, chlorine, can be reacted with sodium tetrabutylaluminum using the following procedure:

A dry 250 ml. three-necked flask is fitted with a stirrer, a condenser, a dropping funnel, and two gas inlets. One is used as a means to add argon gas. The flask is swept with argon gas, and an argon atmosphere is maintained throughout the reaction. The entire reaction apparatus is painted black to exclude actinic radiation. 13.9 grams (0.05 moles) of sodium tetrabutylaluminum was weighed into this flask. There is then added 100 ml. of octane. By means of the other gas inlet 1.78 grams (0.05 moles) of chlorine gas is slowly added beneath the surface of the reaction mixture over a period of about three hours. The reaction takes place at room temperature (25° C.), and sodium chloride begins precipitating as the reaction progresses. About 2.4 grams of butyl chloride can be recovered from the reaction mixture.

In each of the above examples recovery of the products of the reaction is effected by (1) centrifuging the reaction mixture to separate the solid alkali metal halide salt from the liquid organic components, (2) decanting the liquid organic layer, and (3) distilling the organic liquid to separate the organic components.

Aliphatic halides are not active halogen compounds and will not react with alkali metal tetraalkylaluminum compounds. Halogenated paraffins, for example, do not react with alkali metal tetraalkylaluminum compounds. Active halogen compounds other than those specifically mentioned above react with alkali metal tetraalkylaluminum compounds. For example, the active halogen compounds, epichlorohydrin, chlorodimethylamine, and chlorodimethylphosphine react with the alkali metal tetraalkylaluminum compounds hereinbefore described and can also be alkylated by the foregoing procedure.

What is claimed is:

1. A process for alkylating an activated halogen compound comprising reacting (1) an activated halogen compound which is an allyl halide selected from the group consisting of allyl chloride, allyl bromide, and allyl iodide, with (2) an alkali metal tetraalkylaluminum compound of the formula $$MAlR_4$$

wherein M is an alkali metal selected from the group consisting of lithium, sodium, and potassium, and R is an alkyl group containing from about 1 to about 10 carbon atoms, at a temperature of from about 20° C. to about 100° C. wherein the reaction is conducted under the atmosphere of an inert gas and the ratio, on a molar basis, of said active halogen compound to said alkali metal tetraalkylaluminum compound is from about one to about three parts of said halogen compound per one part of said tetraalkylaluminum compound.

2. The process of claim 1 wherein the active halogen compound is allyl bromide and the alkali metal tetraalkylaluminum compound is sodium tetrabutylaluminum.

References Cited

UNITED STATES PATENTS

| | | | |
|---|---|---|---|
| 2,136,178 | 11/1938 | Carothers et al. | 260—677 |
| 2,576,311 | 11/1951 | Schlesinger et al. | 260—677 |

DELBERT E. GANTZ, Primary Examiner

CURTIS R. DAVIS, Assistant Examiner